United States Patent Office 2,793,774
Patented May 28, 1957

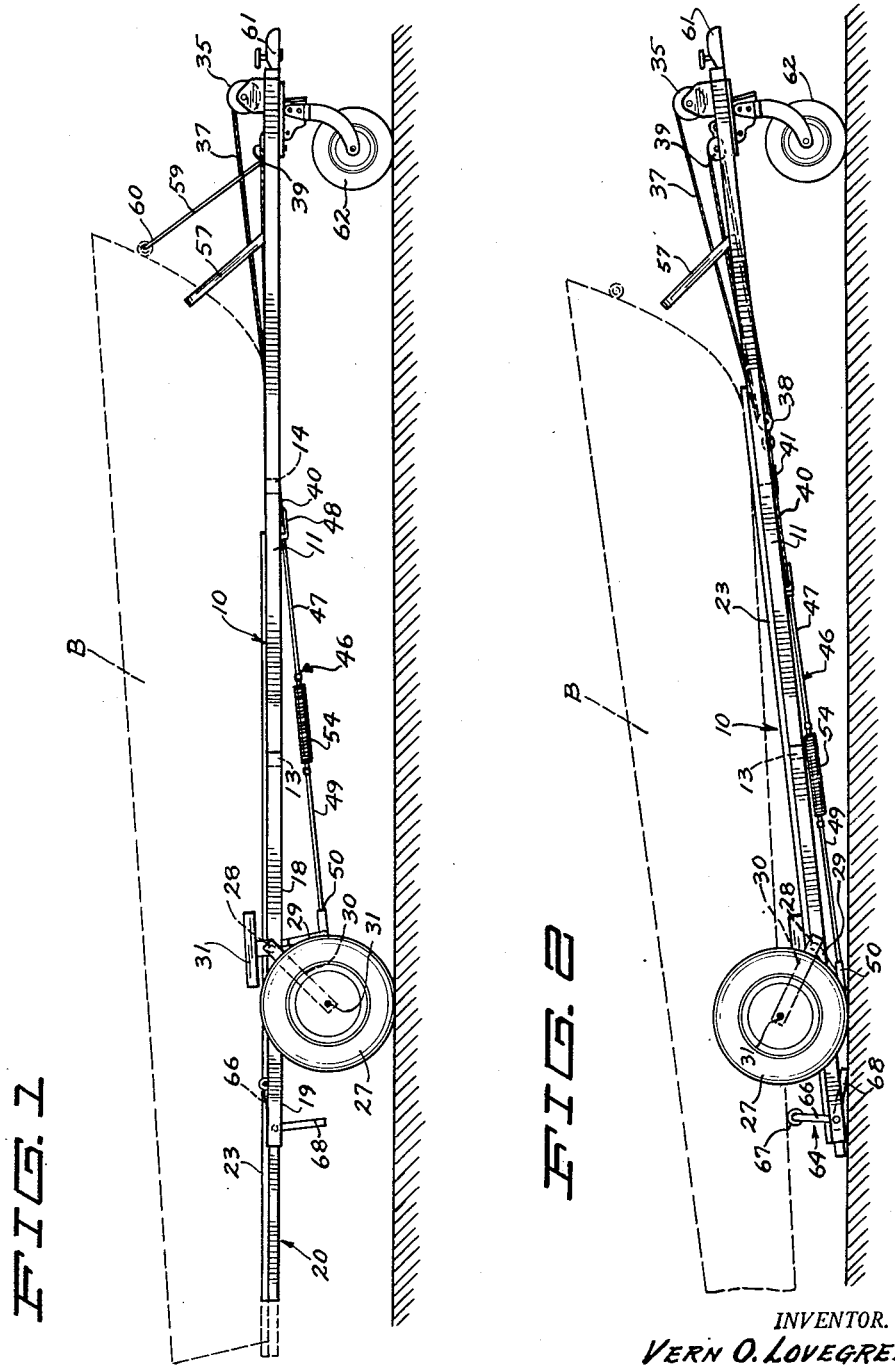

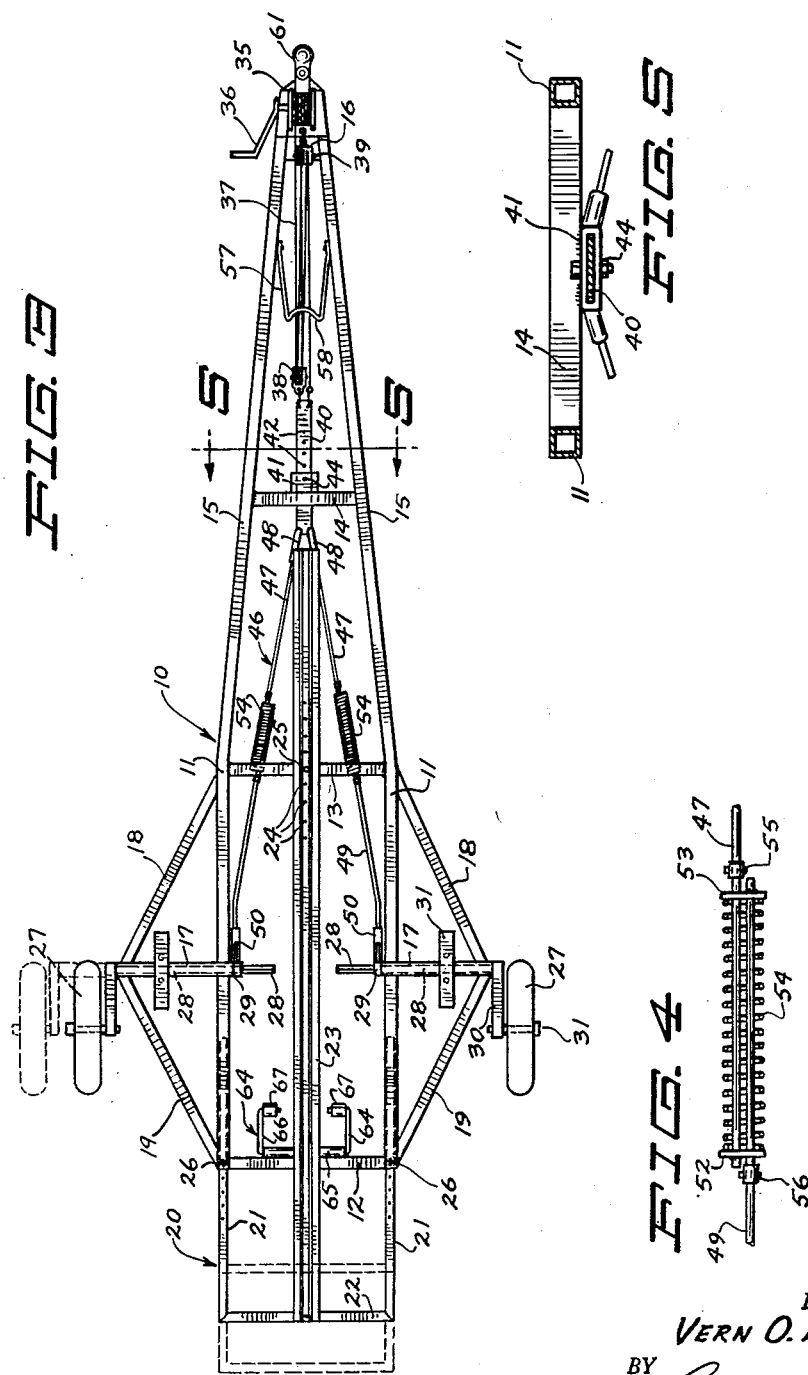

2,793,774

BOAT TRAILER

Vern O. Lovegreen, Minneapolis, Minn.

Application January 20, 1955, Serial No. 483,078

4 Claims. (Cl. 214—505)

This invention relates generally to trailers for transporting boats and more particularly concerns such a trailer as is adapted to be driven into the water and lowered with respect to its transport wheels for launching or loading a boat in a convenient manner.

A principal object of the invention is to provide a boat trailer having an improved transport wheel mounting which allows the trailer frame to be simply and readily moved between a raised transport and a lowered launching position and including a mechanism for absorbing road shocks during transport.

Another object of the invention is to provide a boat trailer having a new and improved frame structure which is particularly adapted for economical and durable mounting of ground wheels on a crank axle.

Another object of the invention is to provide a boat trailer with a boat supporting frame which is longitudinally adjustable to accommodate boats of different lengths.

Another object of the invention is to provide a wheeled boat trailer adapted to be lowered relative to its supporting wheels for launching a boat carried thereby and having elevator means for automatically raising the boat from the trailer bed as the trailer is lowered.

Still another object of the present invention is to provide a boat trailer having a frame so mounted on transport wheels as to allow the frame to be lowered to a position where it will lie flat upon the ground to facilitate loading or launching a boat.

Still another object of the invention is to provide a boat trailer having a frame mounted on ground wheels for raising and lowering relative to the ground whereby a boat supported on the frame will descend between the wheels as the frame is lowered, and said ground wheels being laterally movable relative to the frame to increase the transverse spacing therebetween when the frame is lowered.

With these objects in view my invention broadly comprises a boat trailer having a frame, a winch means at the forward end of the frame, a pair of crank axles journaled on the frame, a ground wheel on each crank axle for rotation about an axis spaced from the axis of the axle, a lever on the axle for rotating the axle to raise or lower the wheel relative to the frame, longitudinally rigid cable means connecting each lever to the winch means, said cable means being yieldably extensible for absorption of road shocks transferred to the ground wheels, and an elevator device on the frame for elevating the boat from the frame as the ground wheels are raised to lower the frame to the ground.

The above mentioned and still additional objects of the invention will be brought to light during the course of the following specification, reference being made to the accompanying drawings, in which—

Fig. 1 is a side elevation of the trailer with the ground wheels in transport position and showing the use of a front caster wheel on the trailer.

Fig. 2 is a side elevation of the trailer, with the wheels raised to bring the frame to a launching condition.

Fig. 3 is a plan view of the trailer with the ground wheels in lowered or transport position.

Fig. 4 is an enlarged detail view of the ground wheel shock absorbing mechanism.

Fig. 5 is an enlarged detail section taken on line 5—5 of Fig. 1.

Referring now more particularly to the drawings reference numerals will be used to denote like parts or structural features in the different views. The numeral 10 designates generally the trailer frame. It is preferably formed of tubular steel and includes side bars 11 rigidly connected by transverse members 12, 13 and 14. The frame members lie on a common horizontal plane and members 11 have their rear portions parallel and their forward portions 15 converging for connection at their front ends by means of a gusset plate 16. The members 12, 13, 14 and 11 are welded or otherwise integrally connected together. Also lying on the horizontal plane of the members 11 and extending therethrough and laterally outward therefrom are a pair of transversely aligned bearing tubes 17. These tubes are open at each end and are supported in their laterally extending positions by front and rear bracing members 18 and 19 which extend from points near the extended end of each tube to points on the bar 11 spaced fore and aft from the junction of the tube and side bar 11.

The frame has a rear end extension frame denoted generally at 20. This extension consists of a pair of side members 21 which are telescopically inserted within the rear open ends of the side bars 11. Members 21 are rigidly associated by a cross bar or beam 22 connecting their rear ends whereby the extension 20 is slidable as a unit to longitudinally adjust the length of the trailer frame.

An upwardly opening channel member 23 which serves as a keel rest has its rear end bolted or otherwise secured to the center of bar 22 and extends forwardly parallel to side bars 11 and medially therebetween over frame cross bars 12 and 13. It has a row of apertures 24 adapted to be selectively mated with a vertical opening (not shown) in member 13. A pin 25 is removably inserted through the aligned aperture 24 and the opening in member 13 to lock the extension 20 and channel 23 in any selected position of longitudinal adjustment. Pins 26 also fit through appropriate apertures to lock member 21 at any adjusted position within the members 11. The channel in member 23 is of sufficient depth and width to receive the keel of the boat B to be transported on the trailer.

The trailer is provided with ground wheels 27 which are mounted on the frame 10 in a manner now to be described. Shafts 28 are journaled one within each bearing tube 17 for rotation on a common transverse axis. Each shaft 28 has its ends extending outwardly beyond the tube ends with a lever arm 29 fixed to the shaft inner end portion and against the end of tube 17. Arms 29 extend downwardly and slightly forwardly from shaft 28 when the wheels are in the lowered or transport position such as shown in Figs. 1 and 3. Wheel support arms 30 are fixed one to the outer end of each shaft 28 and extend diagonally downward and rearward when the wheels are in transport position and carry stub shafts 31 at their lower ends on which the wheels 27 are journaled. Wheel skirts or fenders may be mounted over the wheel, being affixed to arm 30 or a suitable bracket. Shaft 28 is provided with a keyway for receiving a set screw on the lever arm 29 allowing the shaft to be pulled outwardly when desired during launching or loading of the boat.

As heretofore stated, when the shaft 28 is so disposed within sleeve 17 so that arm 30 extends downwardly therefrom, as in Fig. 1, the wheel 27 is in lowered position relative to frame 10 and lever 29 is in a generally depending position. When lever 29 is allowed to move rearwardly the arm 30 will swing upwardly about the axis of shaft 28 raising wheel 27 to the position shown in Fig. 2. Boat rests 31 are mounted one on each bearing 17 to support the boat on each side of the keel.

The mechanism for moving lever 29 and retaining it in the desired position will now be described. A winch drum 35 having an operating handle 36 is mounted upon plate 16. The winch drum has wound thereon one end of a cable 37. The cable 37 is trained alternately over the sheaves of rear and front pulley blocks 38 and 39, the latter of which is attached to plate 16. The rear pulley block 38 and the free end of the cable 37 are attached to the rear end of an elongated adjustment plate 40. Plate 40 is mounted for fore and aft sliding movement in an open end slide member 41 which is rigidly mounted on the cross beam 14 (Fig. 5). Plate 40 has a longitudinal row of apertures 42 adapted to be selectively mated with an aperture in the slide member carrying pin 44 to lock the plate at any desired position within the slide.

The plate 40 has its rear end connected to each of the levers 29 by means of tie rod assemblies, each designated generally at 46. Each assembly 46 comprises a front rod 47 connected to plate 40 by means of yoke 48 and a rear rod 49 connected to lever 29 by means of yoke 50.

The connection between front rod 47 and the rear rod 49 includes a shock absorbing mechanism and is shown in detail in Fig. 4. The rod 47 has a stop washer or plate 52 secured as by welding to its rearmost end. Plate 52 is provided with an aperture through which the rear rod 49 loosely extends. The front end of rod 49 is provided with a similar stop plate 53 which is apertured for the slidable reception of rod 47. The two rods are accordingly slidably interconnected for extension or retraction of the tie rod assemblies 46. A spiral spring 54 encircles the rod portions intermediate plates 52 and 53 and is held under compression with its ends abutting against the plates to yieldably urge the rods in a relatively retracting direction. Stop collars 55 and 56 are provided respectively on rods 47 and 49 fore and aft of the shock absorbing connection to limit contracting movement of the tie rod assembly.

The shock absorbers in the tie rod assemblies 46 cushion the riding of the boat during transport as the ground wheels 27 are allowed to move vertically a limited distance independent of the frame when they engage irregularities in a road surface. The stop collars 55 and 56 prohibit forward movement of levers 29 to the point where the wheels 27 can swing forwardly past the axis of shaft 28.

Near the front of the trailer there is provided a generally U-shaped bow rest 57 for the boat, said rest having its legs affixed to the opposing side beams 11 with a rearwardly opening seat 58 formed in the bight portion thereof for receiving the bow of boat B to hold the same against lateral displacement during transport. A retaining cable or rod 59 attached to the frame has a hook 60 at its free end for releasable engagement with eye on the boat to secure the boat against the rest 56. The trailer is provided with a hitch member 61 at its front end for vehicle connection and may carry a front wheel 62 if desired.

The adjustment and operation of the trailer will now be explained. Before loading the boat on the trailer the extension frame 20 is first adjusted to the proper longitudinal position to accommodate the boat and locked in such adjusted position by inserting pin 25 through both the aperture 24 registering with the aperture in cross member 13 and said aperture 24. Pins 26 are also placed in position to lock the frame 20.

Pin 44 is then removed from the member 41. With the full weight of the rear portion of the trailer resting upon the shafts 28 any release of forward pull on the levers 29 will allow the trailer to settle to the ground with shafts 28 moving on an arc about the turning axis of ground wheels 27. This is accomplished by operating winch 35 to unwind the cable 37 therefrom. As the cable lengthens plate 40 will slide rearwardly under pull of the devices 46 connected to the crank levers 29. When the front wheel is not used on the trailer or is removed for loading the frame 10 will lie flat upon the ground. This fact, of course, facilitates the loading operation.

I provide a boat elevating device near the rear end of the trailer for automatically elevating the boat B relative to the frame 10 as the frame is lowered to the ground. This device is designated generally at 64 and is journaled for swinging movement on a transverse axis in bearing 65 mounted on the cross bar 12. The device has a pair of forwardly extending elevator arms 66 each of which carries a rotatable roller 67 at its forward end one at each side of the keel rest 23. At each side extending at generally right angles to arm 66 the device has an integral downwardly depending ground engaging leg 68 which lies forward of the device pivot axis as to the arms 66. In transport position the elevating device 64 is in the position shown in Fig. 1 with legs 68 directed downwardly and the rollers 67 in engagement with the bottom of the boat B. As the frame 20 is lowered the legs 68 will engage the ground and be caused to swing forwardly and upwardly and arms 66 will rise so that the device is in the position shown in Fig. 2. As the arms 66 swing upwardly and rearwardly the boat is elevated from the frame with rollers 67 rolling rearwardly along the boat bottom.

In loading a boat, when arms 66 extend upwardly the boat B can be moved onto the frame with the bottom thereof moving smoothly along rollers 67. Winch 35 may be used to pull the boat onto the trailer by hooking the sheave block 38 onto the boat itself. As the boat is moved onto the frame the keel is guided into channel 23 and the bow into the seat 58. When the boat has been so loaded sheave block 38 is connected to plate 40 and winch drum 35 is operated to wind the cable in to pull plate 40, the tie rod assemblies 46 and levers 29 in a forward direction. As levers 29 are pulled forwardly the arms 30 will be swung therewith about the axis of shafts 28 to lower the wheels 27 relative to the frame 10 and in effect raise the frame and its load from the ground. While the frame is being raised the elevating device 64 will swing downwardly allowing the rear portions of the boat to come to rest upon the members 23 and 31. When the frame has been raised to the desired elevation pin 44 is inserted to lock the plate 40 and the trailer is in transport condition.

To launch the trailer the steps are reversed, the winch drum being operated to unwind the cable to lower the frame to the ground. When the frame has been lowered levers 29 may be loosened to allow the wheels 27 to be pulled outwardly to positions where they will not interfere with the boat loading or launching operations.

I have thus provided a boat trailer which economically and effectively carries out the aforementioned objectives. It is understood that suitable modifications may be made in the structure as disclosed, provided such modifications come with the spirit and scope of the appended claims.

Having now therefore fully illustrated and described my invention, what I claim to be new and desire to protect by Letters Patent is:

1. In a boat trailer, an elongated frame, a pair of aligned main shafts journaled one at each side of the frame on the rear portion thereof for rotation on a common transverse axis, each main shaft having a crank arm at its outer end, stub shafts on said crank arms, ground wheels journaled on the stub shafts for rotation on axes parallel to said transverse axis, the adjacent end portions of each main shaft carrying a crank lever extending radially from the main shaft axis, power means mounted on the forward portion of the frame, a slide member mounted on the frame intermediate the power means and said main shafts for fore and aft sliding movement and having connection with the power means for movement thereby, a pair of tie rod assemblies each connecting the extended end of one of said crank levers to the slide member, each tie rod assembly including a rigid lever connected member and a rigid slide connected member with spring means yieldably urging said members in a relative longitudinally contracting direction, and locking means for positively locking said slide member at any selected one of several fore and aft positions along the frame.

2. In a boat trailer, an elongated frame, a pair of crank axles journaled one at each side of one end portion of the frame for rotation on a common transverse axis, each axle carrying a ground wheel for rotation on an axis offset from but parallel to said axle axis, a crank lever on each crank axle, a member mounted at the opposite end portion of the frame for adjustment longitudinally of the frame, independent connecting means connecting each lever to said member to limit rotation of the axle, each of said connecting means including a pair of rigid rod members slidably interconnected for relative extension and retraction, and spring means acting between said rod members to urge them in a relatively retracting direction.

3. In a boat trailer, an elongated frame for supporting a boat, ground wheels mounted on the sides of the frame by means of crank axles, means for locking the crank axles with the wheels in lowered transport position, said locking means being releasable to allow the frame to settle to the ground about said crank axles, an elevator arm having one end pivoted on a transverse axis to the frame and extending longitudinally of the frame to engage against the bottom of the boat, a ground leg integrally associated with the arm and extending downwardly below the frame on the same side of said transverse pivot axis as said arm.

4. In a boat trailer, an elongated frame for supporting a boat, ground wheels mounted on the sides of the frame by means of crank axles, means for locking the crank axles with the wheels in lowered transport position, said locking means being releasable to allow the frame to settle to the ground about said crank axles, an elevator arm having one end pivoted on a transverse axis to the frame and extending longitudinally of the frame to engage against the bottom of the boat, a ground leg integrally associated with the arm and extending downwardly below the frame on the same side of said transverse pivot axis as said arm, and the boat bottom engaging portion of said arm carrying a roller for rotation on a transverse axis.

References Cited in the file of this patent
UNITED STATES PATENTS

| | | |
|---|---|---|
| 2,487,701 | Getz | Nov. 8, 1949 |
| 2,496,599 | Rivers | Feb. 7, 1950 |
| 2,506,699 | Byrd | May 9, 1950 |
| 2,564,702 | Linneman | Aug. 21, 1951 |
| 2,594,540 | Cole et al. | Apr. 29, 1952 |
| 2,733,823 | Evans | Feb. 7, 1956 |
| 2,740,639 | Eckroad | Apr. 3, 1956 |